(12) United States Patent  
Mechaley, Jr.

(10) Patent No.: US 9,392,454 B2  
(45) Date of Patent: Jul. 12, 2016

(54) SYSTEM AND METHOD FOR COMPUTER AUTHENTICATION USING IMAGE ANALYSIS OF A SHARED SECRET

(75) Inventor: Robert G. Mechaley, Jr., Kirkland, WA (US)

(73) Assignee: MobileSphere Holdings LLC, Kirkland, WA (US)

( * ) Notice: Subject to any disclaimer, the term of this patent is extended or adjusted under 35 U.S.C. 154(b) by 378 days.

(21) Appl. No.: 13/457,015

(22) Filed: Apr. 26, 2012

(65) Prior Publication Data

US 2013/0291081 A1 Oct. 31, 2013

(51) Int. Cl.
  *G06F 7/04* (2006.01)
  *G06F 15/16* (2006.01)
  *G06F 17/30* (2006.01)
  *H04L 29/06* (2006.01)
  *H04W 12/06* (2009.01)
  *G06F 21/34* (2013.01)
  *G06F 21/36* (2013.01)
  *H04L 9/32* (2006.01)
  *G06F 21/60* (2013.01)

(52) U.S. Cl.
  CPC ............. *H04W 12/06* (2013.01); *G06F 21/34* (2013.01); *G06F 21/36* (2013.01); *G06F 21/60* (2013.01); *H04L 9/3226* (2013.01)

(58) Field of Classification Search
  CPC ......... H04L 9/32; H04W 12/06; G06F 21/00; G06F 21/34; G06F 21/35; G06F 21/36; G06F 21/445
  USPC ........................ 713/154, 168, 172; 726/5–7, 9
  See application file for complete search history.

(56) References Cited

U.S. PATENT DOCUMENTS

| | | | | |
|---|---|---|---|---|
| 2007/0255953 A1* | 11/2007 | Peyret | ...................... | H04L 9/32 713/168 |
| 2008/0013832 A1* | 1/2008 | Lev | ..................... | G06K 9/00624 382/181 |
| 2008/0175377 A1* | 7/2008 | Merrill | .................... | G06F 21/36 380/30 |
| 2008/0209223 A1* | 8/2008 | Nandy | .................... | G06F 21/36 713/185 |
| 2011/0145901 A1* | 6/2011 | Di Crescenzo | ......... | G06F 21/36 726/7 |
| 2012/0278879 A1* | 11/2012 | Ganem | .................. | G06F 21/34 726/16 |
| 2012/0287290 A1* | 11/2012 | Jain | ........................ | H04L 63/18 348/207.1 |
| 2013/0152176 A1* | 6/2013 | Courtney | ................ | G06F 21/36 726/5 |

* cited by examiner

*Primary Examiner* — Andrew Nalven
*Assistant Examiner* — Quy Pham
(74) *Attorney, Agent, or Firm* — Michael J. Donohue; Davis Wright Tremaine LLP (57) ABSTRACT

Client and server computers on a network can be authenticated using a shared secret. During a log-on and authentication process, the server transmits an image to the client. A mobile communication device captures and analyzes the image. If the image contains the shared secret, the mobile device can authenticate the server. The secret in the image can be a geometric relationship between elements of the picture, a mathematical relationship between elements, a particular number or types of elements in the picture, colors of elements, or combinations of the above. A single image may contain multiple shared secrets. The mobile device can readily analyze the image to determine if it contains the shared secret and thereby authenticate the server.

29 Claims, 8 Drawing Sheets

SYSTEM AND METHOD FOR COMPUTER AUTHENTICATION USING IMAGE ANALYSIS OF A SHARED SECRET

BACKGROUND OF THE INVENTION

1. Field of the Invention

The present disclosure is directed to authentication systems in general and, more specifically, to a system and method for computer authentication using image analysis of a shared secret.

2. Description of the Related Art

Early computer systems usually involved a large mainframe computer to which a number of terminals were directly connected. In early computer systems, these terminals were often in the form of teletype machines. Early computers also had card readers that were also directly connected to the machine. Network security generally involved simply providing a user identification (ID) and password.

The development of networked computer systems and a client server architecture meant that computer terminals were often connected together over great distances using a wide-area network (WAN), such as the Internet. Early computer terminals evolved from a "dumb" terminal to sophisticated computers with a significant amount of computing power in each of the various system servers and clients.

Computer security has become a much greater concern because of the accessibility of many computer networks via a WAN. Early computer security was generally directed towards authentication of a user wishing access to a computer system or network. Different techniques have evolved to provide authentication of the user. The most common form is a user name and password that should be known only to the individual user and to the server with which the user wishes to connect.

Although techniques have been developed to authenticate a user wishing access to a computer system or network, there is still a significant need for techniques to authenticate the computer system or network to the user. For example, a user accessing a bank account via the WAN wants to be sure they are communicating with their bank instead of an unscrupulous computer server that "spoofs" the actual bank website. If the user is fooled into believing that they have accessed their bank website, the user may unknowingly divulge confidential information such as user names, passwords, account numbers, credit card numbers, and the like. Unfortunately, the user often discovers the spoofing only after their account has been hacked and money has disappeared from their account.

Therefore, it can be appreciated that there is a significant need for techniques for computer authentication. The present disclosure provides this, and other advantages, as will be apparent from the following detailed description and accompanying figures.

DETAILED DESCRIPTION OF THE INVENTION

As noted in the background section, early computer security generally related to the problem of user authentication. However, the development of sophisticated computer networks or distributed networks accessible via a wide-area network (WAN), such as the Internet, have given rise to a need for the authentication of the computer system as well as the individual. In one example provided above, an individual wants to authenticate their bank computer network prior to providing any confidential information to an unauthenticated computer network. Similarly, government or military computer networks have a great need for increased security in the form of computer network authentication in addition to authentication of the individual seeking access to the computer network. That is, it is important for a user to authenticate that they are truly accessing a government or military computer network prior to disclosing any confidential or proprietary information. Similarly, large businesses may have distributed computer networks and employees accessing the network must be authenticated to the computer system. In addition, the techniques described herein can be used to authenticate the computer to the individual. Specifically, a secret is shared between two elements in the system. At a subsequent time, when authentication is required, one system element creates an image using the shared secret and transmits that image. The other system element with knowledge of the shared secret captures the image and analyses it to determine if it was constructed in accordance with the shared secret. Since the shared secret was known only to two trusted elements within the system, if the image contains the shared secret, those elements can be authenticated.

Figure 1:
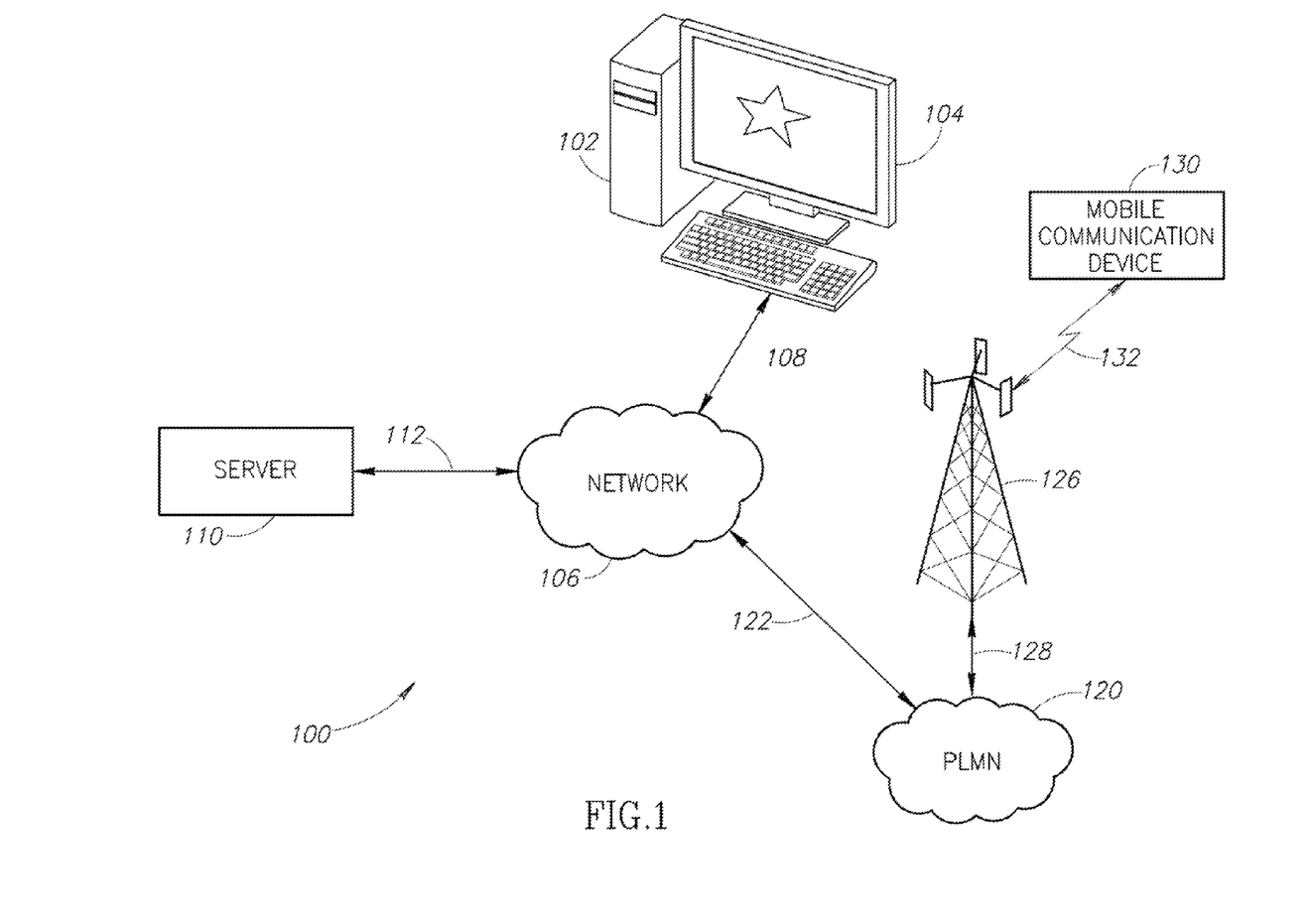
FIG. 1 is an exemplary embodiment of a system architecture constructed in accordance with the present teachings.

The present disclosure is embodied, in one example, in a system 100 illustrated in FIG. 1. A computer 102 having a display 104 is coupled to a network 106, such as the Internet, via a communication link 108. The computer 102 includes a network interface controller (NIC) (not shown) to provide the necessary connectivity to the communication link 108. The network 106 in FIG. 1 generically represents networks and typically would represent a wide-area network (WAN). The network 106 may be implemented as the Internet, or a private WAN. The system 100 is not limited by the specific form of the network 106. The system 100 provides a technique to verify the identity of a user of the computer 102. Once such example is described in pending U.S. application Ser. No. 12/961,392 filed on Dec. 6, 2010, entitled "System and Method for Identity Verification on a Computer," and assigned to the assignee of the present disclosure. That application is incorporated herein by reference in its entirety. The computer 102 may be a private computer (e. g., an individual's personal computer) or a public computer (e.g. in a library or hotel lobby). Furthermore, although the computer 102 is illustrated as a personal computer, those skilled in the art will appreciate that the principles of the system 100 are applicable to any computing device capable of rendering images, such as an automated teller machine (ATM), point-of-sales (POS) terminal, or the like. Thus, the system 100 is not limited to a particular form of computing device.

The system 100 includes a server 110 coupled to the network 106 via a communication link 112. In the following discussions, the server 110 generically represents the computer system or computer network which requires authentication to the user of the computer 102. Those skilled in the art will appreciate that the server 110 can be implemented in a variety of different fashions as a single server, multi-server, large frame computer, or the like. The server 110 may also represent a computer network, such as a government, military, or corporate computer network that the computer 102 wishes to access. The system 100 is not limited by the specific implementation of the server 110.

As will be described in greater detail below, the server 110 may initiate the authentication process. For example, the server 110 could host a website for on-line purchases. Alternatively, the server 110 may host the website for a bank or other financial institution. In yet another alternative embodiment, the server 110 may host a secure website, such as a business, law firm, or the like. In this embodiment, the server 110 effectively acts as a gateway and may provide access to a secure local area network (LAN). If the computer 102 wishes to access the server 110, the server initiates the user authentication process. In a simple embodiment, user authentication may simply be a user ID and password. Other authentication processes, such as described in the above-referenced patent application (U.S. application Ser. No. 12/961,392) may be used.

The system 100 utilizes a mobile communication network, such as a public land mobile network (PLMN) 120 coupled to the network 106 via a communication link 122. Those skilled in the art will appreciate that the communication links 108, 112, and 122 may be implemented in many different forms, including hard wired, fiber optic, microwave, wireless, or the like. For example, the communication link 108 connecting the computer 102 to the network 106 may be implemented using a dial-up modem, cable modem, satellite connection, wireless network, or the like. The system 100 may be satisfactorily implemented by one or more of these technologies, alone or in combination, for the communication links 108, 112, and 122. The system 100 is not limited by the specific form of these communication links.

A base station 126 is coupled to the PLMN 120 via a backhaul communication link 128. Those skilled in the art will appreciate that a typical wireless communication network, such as the PLMN 120, includes a large number of base stations. However, for the sake of clarity, FIG. 1 illustrates only the base station 126.

A mobile communication device 130 is coupled to and in communication with the base station 126 via a wireless link 132. The mobile communication network, including the PLMN 120, base station 126, and mobile communication device 130 are illustrated in FIG. 1 as a generic wireless communication system. Those skilled in the art will appreciate that the elements of FIG. 1 that make up the wireless network may be implemented in accordance with any known wireless communication system. For example, the PLMN 120, base station 126 and mobile communication device 130 may be implemented in accordance with any known communication protocol, such as GSM, CDMA, WiFi, WiMAX, 3G, 4G, LTE, or the like. Operational details of these various communication protocols are known in the art and need not be described in greater detail herein.

As will be described in greater detail below, the server 110 generates an image in accordance with the shared secret and transmits the image to the computer 102 via the network 106. The image is shown on the display 104. To authenticate the server 110, the user snaps a picture of the image on the display 104 using an imaging capability in the mobile communication device 130, such as a camera. The image captured by the mobile communication device 130 is evaluated to determine if it contains the shared secret. The captured image is transmitted to the PLMN 120 and relayed back to the server 110 only if the image contains the shared secret. If the image contains the shared secret, the server 110 is authenticated because only the server 110 and the mobile communication device 130 have knowledge of the shared secret.

Image comparison technology within the server 110 compares the captured image from the display 104 to the original image transmitted from the authentication server. If the images match to a sufficient degree, the user identity is verified by virtue of the user identification associated with the mobile communication device 130 and the server 110 is authenticated by virtue of the image that contains the shared secret.

Figure 2:
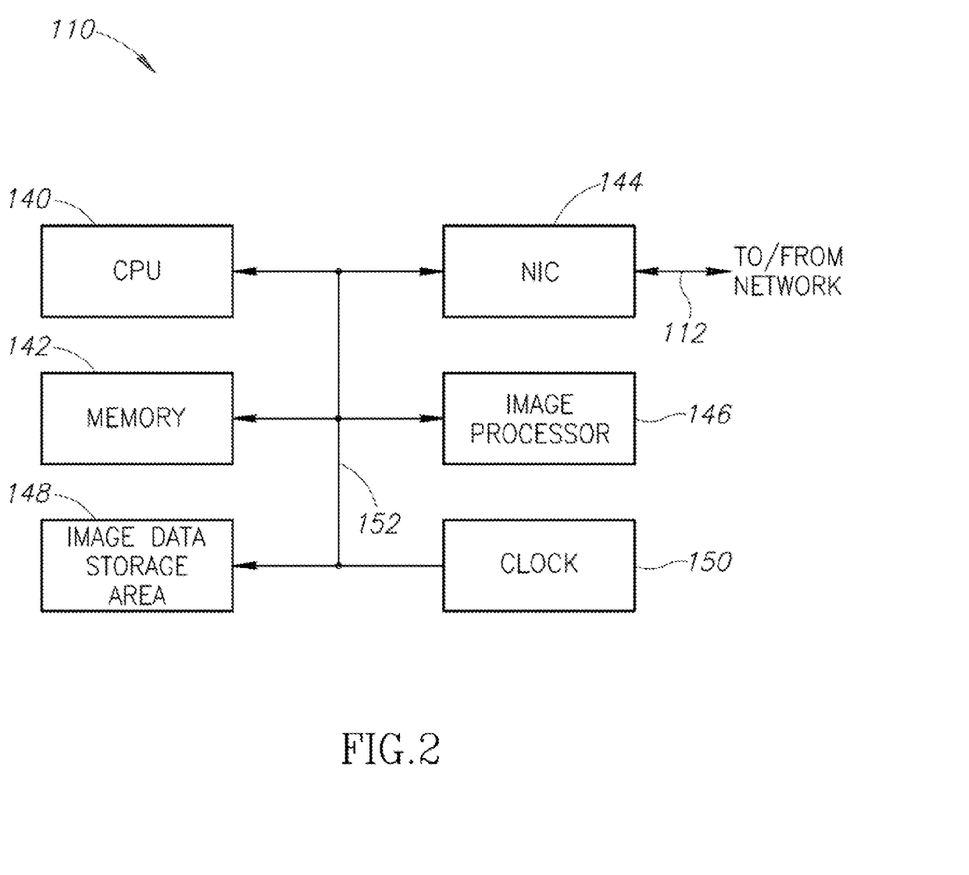
FIG. 2 is a functional block diagram of a server constructed in accordance with the present teachings.

FIG. 2 is a functional block diagram of the server 110. The server 110 includes a central processing unit (CPU) 140 and a memory 142. In general, the memory 142 contains data and instructions that are executed by the CPU 140. The CPU 140 may be implemented as a conventional microprocessor, microcontroller, digital signal processor, application specific integrated circuit, or the like. The server 110 is not limited by the specific implementation of the CPU 140.

Similarly, the memory 142 may be implemented with a variety of known technologies. The memory 142 may include random access memory, read-only memory, programmable memory, and the like. In one embodiment, a portion of the memory 142 may be integrated into the CPU 140. The server 110 is not limited by the specific form of the memory 142. The shared secret is stored in the memory 142 in association with the individual user. The shared secret may be stored in a protected form, such as encrypted data, secure location, or the like.

FIG. 2 also illustrates a network interface controller (NIC) 144. The NIC 144 generically represents the interface between the server 110 and the network 106. The specific implementation of the NIC 144 depends on the particular interface type and is within the scope of knowledge of one of ordinary skill in the art. For example, the NIC 144 may be an Ethernet interface coupled to a network access point (not shown). Alternatively, the NIC 144 may be a wireless interface or other known form of interface depending on the nature of the communication link 112 between the server 110 and the network 106. The server 110 is not limited by the specific implementation of the NIC 144.

The server 110 also includes an image processor 146 and an image storage area 148. As will be described in greater detail below, the image processor 146 may be used in one embodiment to generate images in accordance with the shared secret. If the image processor 146 generates the image for transmission to the computer 102, a copy of the image is temporarily stored in the image storage area 148 for later comparison with a captured image. As described above, the user captures the image on the display 104 with the mobile communication device 130 and analyzes it to verify that the image on the display 104 contains the shared secret known only to the authentic server 110 and to the mobile communication device 130. If the image contains the shared secret, the mobile communication device 130 transmits the captured image, via the PLMN 120 and the network 106, to the authentication server 110. The image processor 146 compares the captured image with the generated image to determine if they match.

FIG. 2 also illustrates a clock 150. As will be described in greater detail below, the image processor 146 can use the clock 150 to generate a time of day or date stamp when generating an image or when selecting an image from the image storage area 148. The date stamp can be used to make sure that the image is current. That is, the image is only valid for a predetermined period of time.

The various components of FIG. 2 are coupled together by a bus system 152. The bus system 152 may comprise an address bus, data bus, control bus, power bus, and the like. For the sake of clarity, those various buses are illustrated in FIG. 2 as the bus system 152.

Those skilled in the art will appreciate that some of the functional blocks in FIG. 2 may be implemented as a set of instructions stored in the memory 142 and executed by the CPU 140. For example, the image processor 146 can be implemented as a separate device (e.g., a digital signal processor) or implemented as a set of instructions stored in the memory 142. Because the image processor 146 performs a separate function, it is illustrated as a separate block in the functional block diagram of FIG. 2.

Similarly, the image storage area 148 may be implemented as a separate storage component or integrated into the memory 142. The image storage area 148 may be implemented as any suitable data structure. In one embodiment, the image storage area 148 may be implemented as a database that may be an integral part of the server 110 or implemented as a separate component coupled to the authentication processor 110. For example, the image storage area 148 may be coupled to the server 110 via a local area network (LAN). In a distributed computer network, the image storage area 148 may be coupled to the network 106 and in communication with the server 110 via the network.

Figure 3:
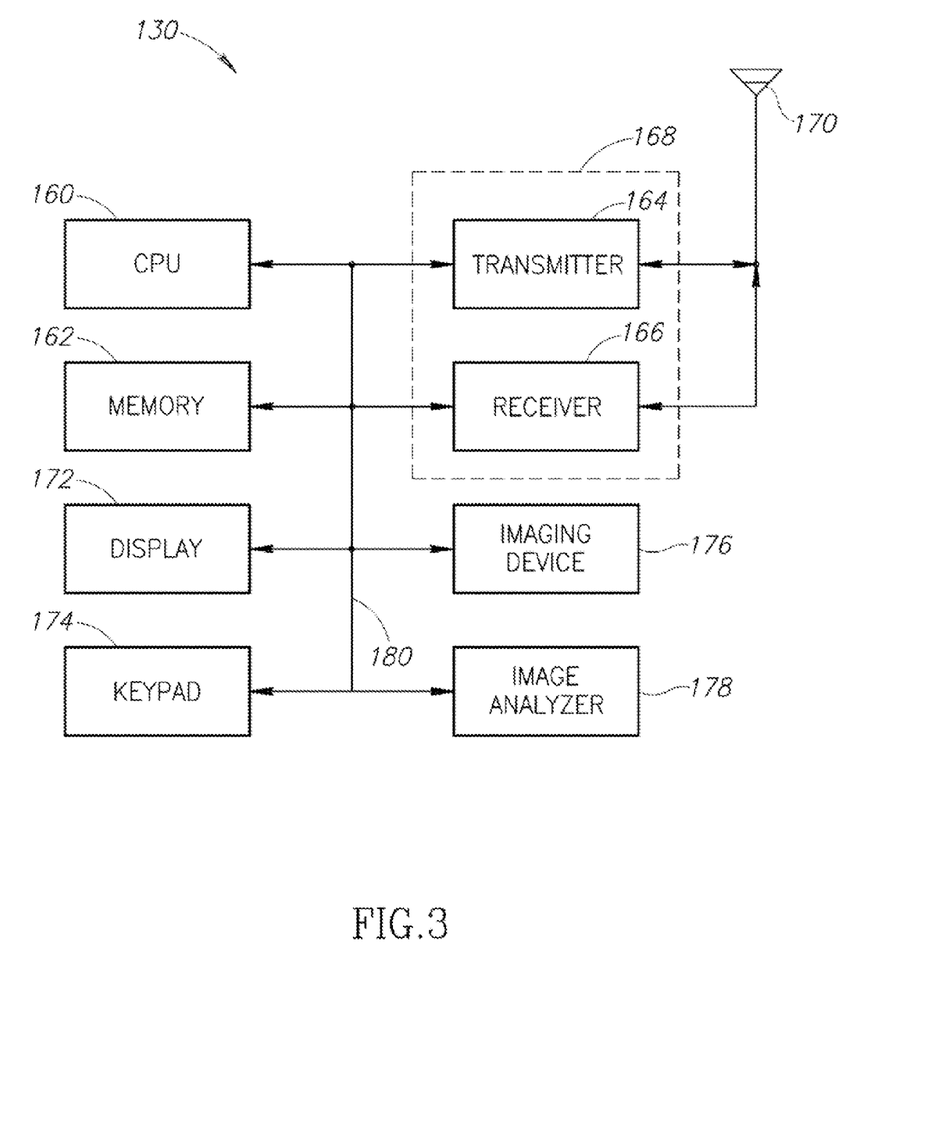
FIG. 3 is a functional block diagram of a mobile communication device constructed in accordance with the present teachings.

The mobile communication device 130 performs a number of functions. First, it takes a picture of an image displayed on the display 104 of the computer 102. Secondly, it analyzes the captured image to determine whether it contains the shared secret. Details of the shared secret analysis and examples are provided below. If the image does contain the shared secret, the server 110 is authenticated. In that event, the mobile communication device 130 provides a file name for the captured image. In an exemplary embodiment, the file name of the image may include the IMSI of the mobile communication device 130 and a time stamp indicating the time at which the image was captured. In addition, the mobile communication device 130 sends the captured image to a predefined address. The mobile communication device 130 executes a simple application program that allows the capture and analysis of an image and the automatic transfer of the captured image, via the PLMN 120, to a URL associated with the server 110.

FIG. 3 is a functional block diagram of the mobile communication device 130. The mobile communication device 130 includes a CPU 160 and memory 162. In general, the memory 162 contains data and instructions that are executed by the CPU 160. The CPU 160 may be implemented as a conventional microprocessor, microcontroller, digital signal processor, application specific integrated circuit, or the like. The mobile communication device 130 is not limited by the specific implementation of the CPU 160.

Similarly, the memory 162 may be implemented with a variety of known technologies. The memory 162 may include random access memory, read-only memory, programmable memory, and the like. In one embodiment, a portion of the memory 162 may be integrated into the CPU 160. The mobile communication device 130 is not limited by the specific form of the memory 162. The memory 162 is also used to store the shared secret. As will be described in greater detail below, the shared secret is known only to the authentic server 110 and to the mobile communication device 130. The mobile communication device 130 captures the image on the display 104 (see FIG. 1) and analyzes the captured image using the shared secret stored in the memory 162.

FIG. 3 also illustrates a network transmitter 164 and a network receiver 166. In many implementations, the transmitter 164 and receiver 166 share common circuitry and are implemented as a transceiver 168. The transceiver 168 is coupled to an antenna 170. The transceiver 168 is illustrated in FIG. 3 as a generic device. Those skilled in the art will appreciate that the specific implementation of the transceiver 168 may depend on the particular PLMN 120 with which the mobile communication device 130 communicates. For example, the transceiver 168 in one mobile communication device 130 may be configured for operation in accordance with GSM standards while the transceiver 168 in a different mobile communication device may be configured for operation in accordance with CDMA or other communication protocols. However, as noted above, the system 100 may be readily implemented on mobile networks using various communication protocols and is not limited to any particular communication protocol.

In addition, the mobile communication device 130 includes a display 172 and keypad 174. The display 172 may be a black and white or color display and, in some embodiments, may be a touch-sensitive display. In this embodiment, the functionality of the keypad 174 may be combined with the display 172. These input/output devices operate in a conventional manner and need no further explanation regarding operational details.

FIG. 3 also illustrates an imaging device 176. The imaging device 176 may include a charge-coupled device and a lens (not shown), as is common in many wireless devices. Technical details of the imaging device 176 to capture an image are well known in the art, and need not be described in greater detail herein.

An image analyzer 178 uses the shared secret stored in the memory 162 to analyze the captured image to determine whether the captured image contains the shared secret. In operation, the image analyzer 178 may typically be implemented as a set of instructions stored in the memory 162 and executed by the CPU 160. Those skilled in the art will appreciate that the image analysis can be readily implemented by the mobile communication device 130 without extensive signal processing or excessive computations.

The various components in FIG. 3 are coupled together by a bus system 180. The bus system 180 may include an address bus, data bus, control bus, power bus, and the like. For the sake of clarity, those various buses are illustrated in FIG. 3 as the bus system 180.

Figure 4:
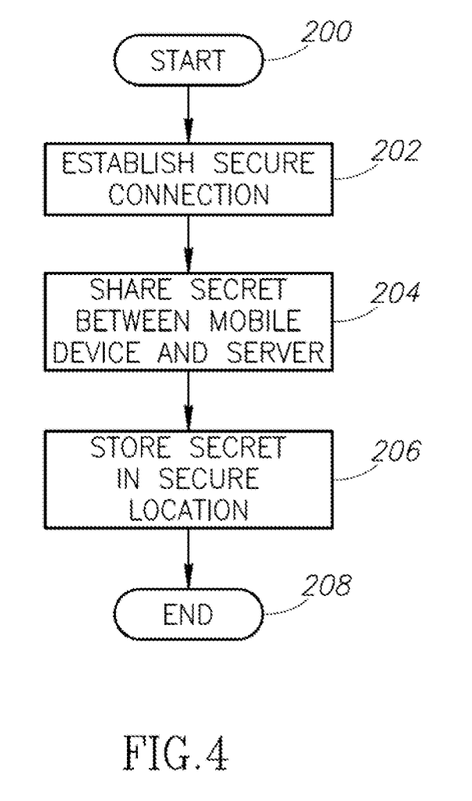
FIG. 4 is a flow chart illustrating an exemplary embodiment of the system to establish a secret shared between the client and server computers.

FIG. 4 is a flow chart illustrating an exemplary embodiment of a process to establish a shared secret. At a start 200, there is the server 110 and the mobile communication device 130. In step 202, the mobile communication device 130 and authentication server 110 establish a secure connection. The secure connection can be established using a variety of known techniques. In one example, the mobile communication device 130 may have web browsing capability. In this embodiment, the mobile communication device 130 can establish a secure connection (e.g., https) with the server 110 via the network 106. In another example, the mobile communication device 130 may be physically connected to the server 110 either directly or through another computer coupled to the server. In this embodiment, there is a secure hard wired connection between the mobile communication device 130 and the server 110. In yet another embodiment, the secure connection can be established between the server 110 and another authenticated computer (not shown) and the shared secret downloaded to a memory device, such as a flash drive. Subsequently, the flash drive can be connected to a computer (not shown) to which the mobile communication device 130 can be connected. The shared secret is thus side-loaded from the memory device to the mobile communication device 130. These are just a few examples of the number of different known techniques that can be used to establish the secure connection.

In step 204, the server 110 shares a secret with the wireless communication device 130. Those skilled in the art can appreciate that either element (i.e., the mobile communication device 130 or the server 110) may initially generate the secret. As will be discussed in greater detail below, the secret will be related to an image such that analysis of the image will be relatively simple. The image need not be created at the time that the secret is shared, but must be generated in accordance with the shared secret. Furthermore, it is important to note that the image itself is not provided to the computer 102 or the mobile communication device 130 in advance of a log-in process and need not be known to the user at all. Some conventional systems allow a user to select a single image during an initial set-up process. Anytime a user logs onto that web site, the user-selected image is displayed as a simple form of server authentication. However, this is not based on a shared secret contained within the image, as is described herein.

In step 206, the mobile communication device 130 and the server 110 store the shared secret in a secure location within the respective devices and the process ends at 208. At this point, the shared secret is known only to the mobile communication device 130 and the server 110. Because the secret was initially shared during a secure connection, the mobile communication device 130 has confidence in the authenticity of the server 110.

Figure 5:
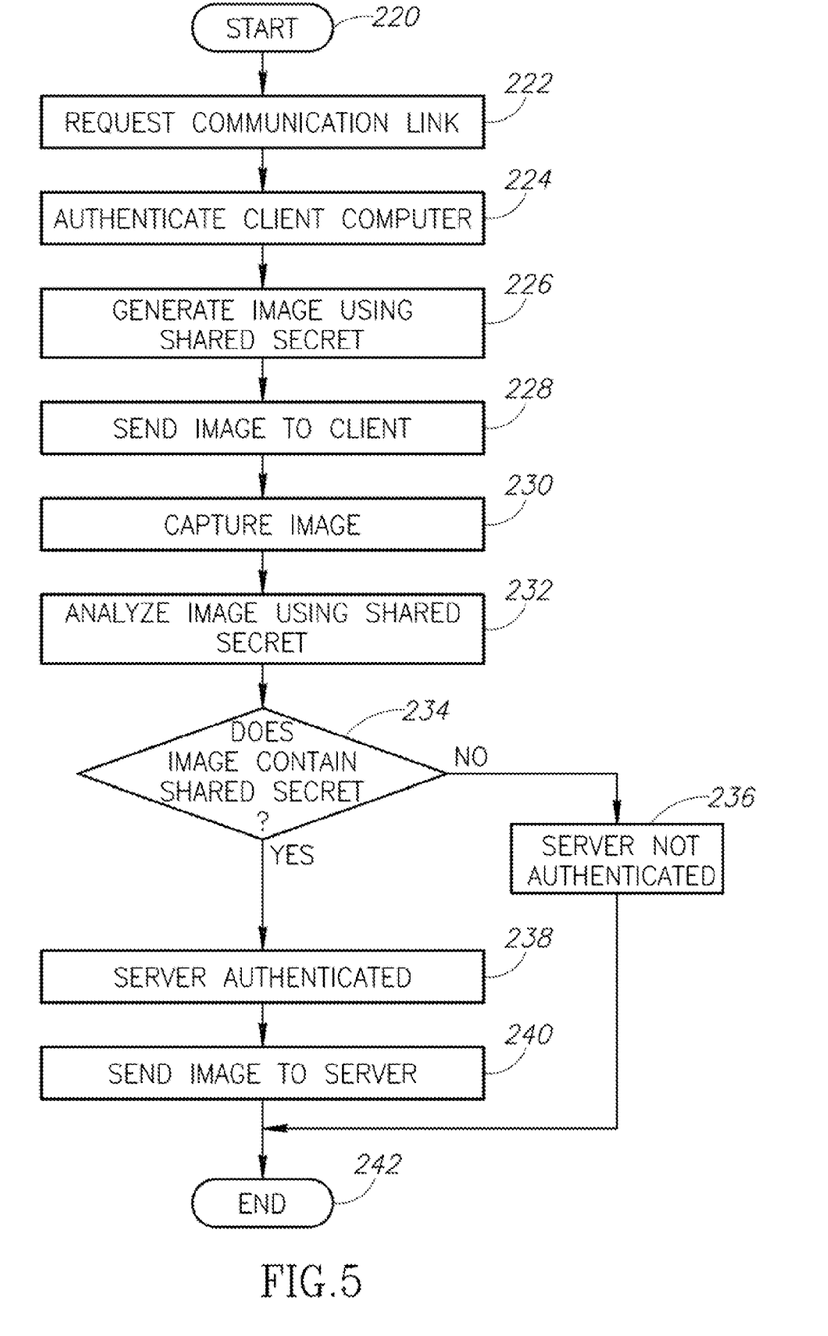
FIG. 5 is a flow chart illustrating an exemplary embodiment of the system to authenticate a server using the shared secret established in FIG. 2.

At a later point in time, the computer 102 wishes to establish a connection with the server 110 via, by way of example, the network 106, as illustrated in FIG. 1. It is at this stage that the computer 102 wishes to authenticate the server 110. This process is illustrated in FIG. 5 where, at a start 220, the computer 102 and server 110 are each connected to the network 106 via their respective communication links 108 and 112. At step 222, the computer 102 generates a request to establish a communication link. This process may be initiated, for example, by the computer 102 navigating to a website associated with the server 110.

In step 224, the system 100 authenticates the computer 102. In a simplified form, the user of the computer 102 may simply provide a user ID and password. However, more advanced authentication procedures may also be used. For example, the process described in U.S. application Ser. No. 12/961,392 describes a technique by which visual images may be used to authenticate the computer 102. Other known techniques may also be used to authenticate the computer 102 in step 224.

In step 226, the server 110 generates an image using the shared secret. In one embodiment, the server 110 dynamically generates the image using the shared secret after the computer 102 requests access to the server 110. However, those skilled in the art will appreciate that the server 110 may also generate the image using the shared secret in advance of any request for access by the computer 102. The generated image may be stored in association with the computer 102 or a specific user, in association with a user name (e.g., user ID) and password. Thus, step 226 may be executed in advance with the generated image being stored for future use.

In step 228, the server 110 transmits the image to the computer 102 via the network 106 and the communication links 112 and 108. Examples of images generated using the shared secret are described below.

In step 230, the user captures the image on the display 104 (see FIG. 1) using the imaging device 176 on the mobile communication device 130 (see FIG. 3). In step 232, the image analyzer 178 within the mobile communication device 130 analyses the image to determine if it contains an element in accordance with the shared secret.

In decision 234, the mobile communication device 130 determines whether the image contains the shared secret. If the captured image does not contain the shared secret, the result of decision 234 is NO and, in step 236, the server 110 is not authenticated. If the server 110 is not authenticated, the mobile communication device will not transmit the captured image back to the server 110. In addition, the mobile communication device may display a message on the display 172 indicating that the server 110 is not authenticated. The user may thus discontinue communication between the computer 102 and the unauthenticated server.

If the captured image does contain the shared secret, the result of decision 234 is YES and in step 238, the server 110 is authenticated. In step 240, the image containing the shared secret is transmitted back to the server 110 via the PLMN 120 as described above. Following the transmission of the image containing the shared secret in step 240 or, if the server was not authenticated in step 236, the process ends at 242.

Figure 6:
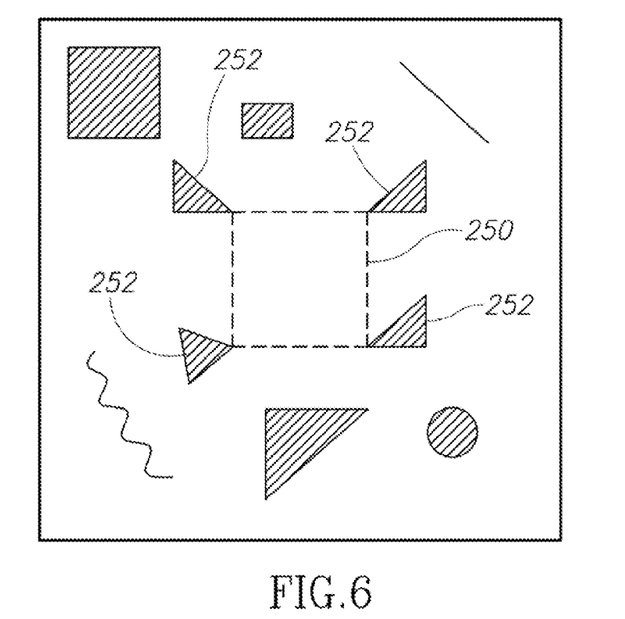
FIG. 6 is an example of an image in which there is a secret geometric relationship between elements of the image.
Figure 7:
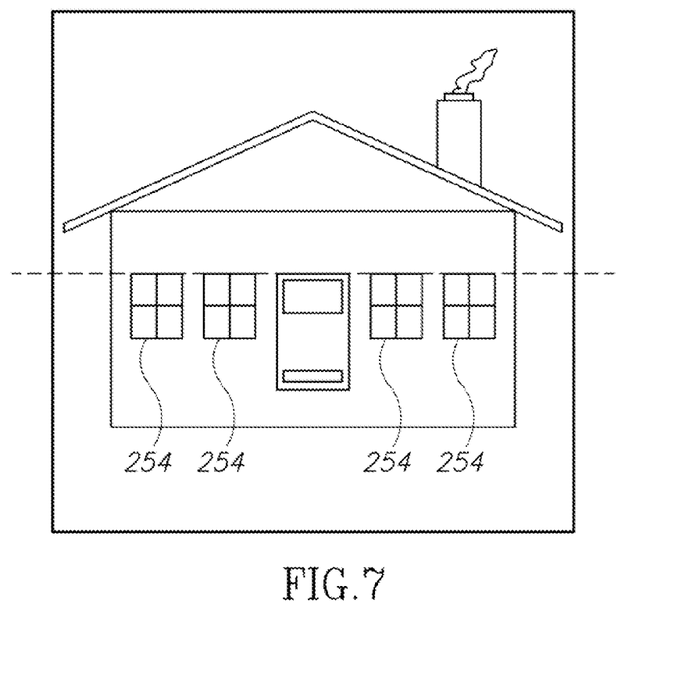
FIG. 7 illustrates an alternative embodiment of an image with a geometric relationship between elements.

FIGS. 6-11 provide non-limiting examples of the type of images that can be created using the shared secret. The images generated using the shared secret may be readily analyzed by the mobile communication device 130 to authenticate the server 110. For example, FIGS. 6 and 7 illustrate images where there is a geometric relationship between objects in the image. FIG. 6 illustrates a seemingly random collection of geometric shapes, such as squares, triangles, rectangles, circles, at the like. However, the shared secret in the example of FIG. 6 is that the image must allow the formation of a square 250 by connecting the vertices of four triangles 252. The precise location of the triangles 252 within the image is not critical. Rather, it is the spatial relationship between the triangles 252 that permits the square 250 to be formed by connecting lines between the vertices of the triangles. Without knowledge of this shared secret, the server 110 cannot generate an image having the appropriate geometric relationship. Furthermore, the mobile communication device 130 cannot analyze the image of FIG. 6 without knowledge of the shared secret. Thus, each of the components (e.g., the mobile communication device 130 and the server 110) must have knowledge of the shared secret. If either of these system elements is not the authentic component, it will not contain the knowledge of the shared secret and cannot provide the proper authentication. In addition, the image of FIG. 6 looks like a random arrangement of objects unless one knows the shared secret.

FIG. 7 can be a picture of a real house or a graphically generated house. Again, without knowledge of the shared secret, the image in FIG. 7 appears to be a normal house. However, the shared secret is that the tops of the windows 254 are all aligned. Thus, it is not merely the presence of the house in the image of FIG. 7 that authenticates the server 110, but that the geometric relationship of the windows 254 is such that the tops of the windows are in alignment. Without knowledge of this shared secret, the server 110 cannot generate the appropriate image and the mobile communication device 130 cannot analyze the image in accordance with the shared secret. Conventional authentication systems may simply send the picture of a house that is known to the user. In contrast, the object in FIG. 7 is not merely identified by the user as a known object, but must contain the shared secret element (e.g., the tops of the windows 254 in alignment). In an exemplary embodiment, the user of the mobile communication device 130 need not even know the shared secret.

Figure 8:
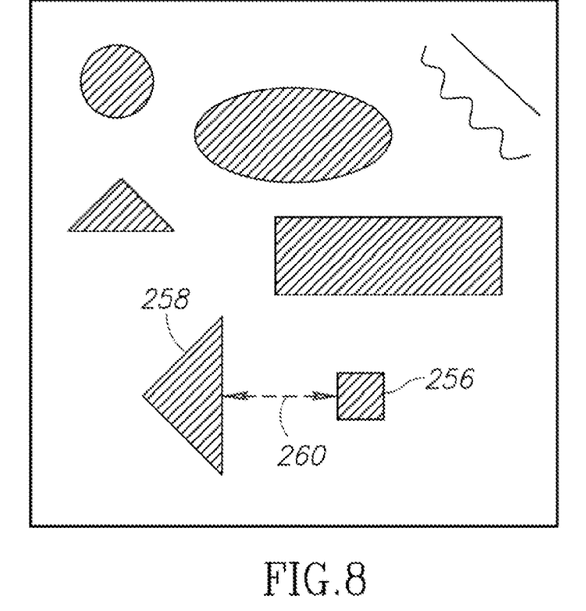
FIG. 8 is an image illustrating a secret mathematical relationship between elements.

In another example embodiment, there is a mathematical relationship between objects in an image. For example, FIG. 8 is similar to FIG. 6 in that it illustrates a number of geometric shapes in what appears to be a random arrangement including a square 256 and a triangle 258. However, in the example of FIG. 8, the shared secret is that the square 256 and triangle 258 are separated by a distance 260 that is 2.5 times the height of the square 256. The absolute location of the square 256 and triangle 258 within the image is not critical. Similarly, the distance 260 between the square 256 and the triangle 258 can vary from one image to another. What is critical is that the distance separating these two objects has a precise mathematical relationship with the height of the square 256. Thus, the image in FIG. 8 can look different each time it is generated so long as the shared secret mathematical relationship between objects is maintained.

Figure 9:
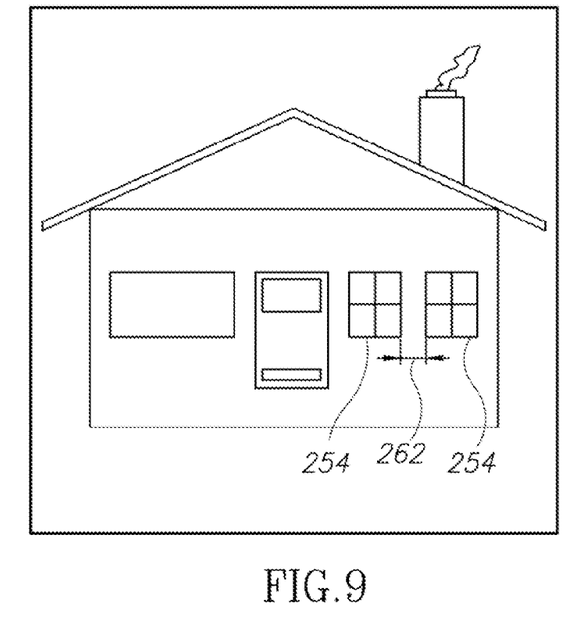
FIG. 9 is an alternative embodiment of an image illustrating a mathematical relationship between the elements.

FIG. 9 illustrates another example of the mathematical relationship between objects within the image. FIG. 9 is similar to FIG. 7 in that it is a picture of a real house or a computer-generated image of a house. In the example of FIG. 7, the shared secret was that the tops of the windows 254 are in alignment. In FIG. 9, the shared secret is that the windows 254 are separated by a distance 262 that is one-half the width of the right-most window. Thus, the shared secret may contain a mathematical relationship between objects in the image that are only known if the mobile communication device 130 and server 110 both know the shared secret.

In yet another example, the shared secret may be that the picture contains a predetermined number of objects or certain types of objects within the picture. For example, the image of the house in FIGS. 7 and 9 contain different shared secrets in images that are quite similar. In yet another example of a shared secret, the image of FIG. 7 must contain exactly four windows 254 and one door. Thus, the same image (e.g., FIG. 7) may be used with different shared secrets.

Figure 10:
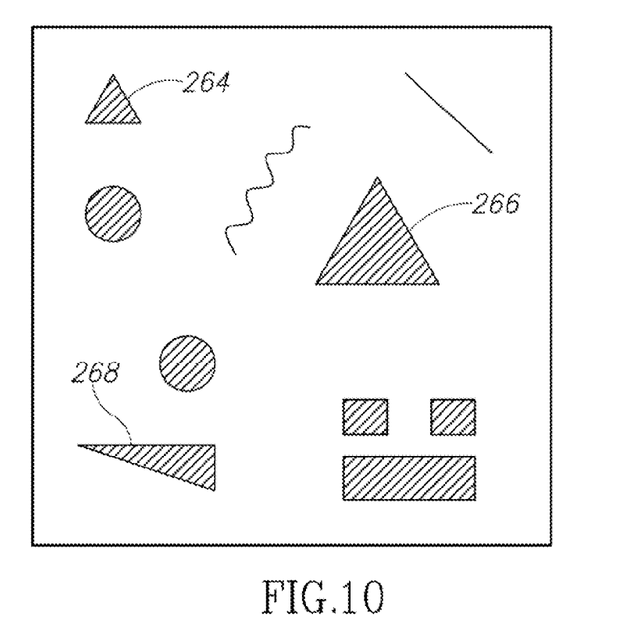
FIG. 10 is an image illustrating a particular number or type of elements in the secret relationship in the image.

In another example, the image in FIG. 10 appears similar to the images in FIGS. 6 and 8 and contains a number of different geometric shapes (e.g., circles, triangles, etc.). The shared secret in FIG. 10 is that the image must contain exactly three triangles 264-268. In yet another variation, the shared secret may be that FIG. 10 must contain the three triangles 264-268, but that two of the triangles must be equilateral triangles (e.g., the triangles 264-266), while the third triangle must be a right triangle (e.g., the triangle 268). Thus, the shared secret may be the number of objects (e.g., the number of triangles) and/or type of objects (two equilateral triangles and one right triangle).

Figure 11:
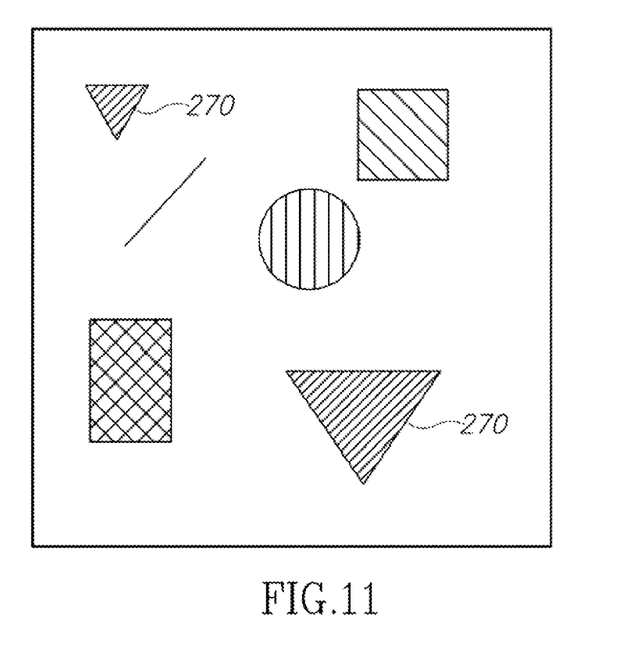
FIG. 11 is an alternative embodiment to FIG. 6 illustrating a particular number or type of elements in the image.

FIG. 11 illustrates yet another example of geometric shapes constructed in accordance with a shared secret. In the example of FIG. 11, the different geometric shapes must each have a different color with the exception of two triangles 270, which must be blue. In this example, it is not the specific shape of the triangles (e.g., equilateral or right triangles), but the number of triangles (e.g., two triangles) and the color of the triangles (e.g., blue).

FIGS. 6-11 illustrate individual examples of shared secrets contained within images. However, those skilled in the art will appreciate that the shared secret may be combinations of objects described above or multiple shared secrets. For example, the image of FIG. 7 may be a combination of shared secrets such as the precise number of windows 254 and doors, the alignment of windows, and the color of the house. Furthermore, the spacing between the windows 254 in FIG. 7 may be yet another shared secret.

Those skilled in the art can appreciate that the analysis of the images to determine whether the shared secret is present is relatively straight forward so long as the mobile communication device 130 and server 110 know the shared secret. The mobile communication device 130 can quickly analyze any of the images illustrated in the examples of FIGS. 6-11 to determine whether the image contains the shared secret. Since only the true mobile communication device 130 and the true server 110 know the shared secret, only those two devices can perform the analysis described above. If the server 110 is not the authentic server, it cannot produce an image in accordance with the shared secret. The mobile communication device 130 can quickly discern that the image does not contain the shared secret such that the server would not be authenticated in step 236 of FIG. 5. Thus, the mobile communication device 130 can readily authenticate the server 110 on the basis of the shared secret.

Those skilled in the art will appreciate that the process described above is particularly valuable when the computer 102 is a public computer whose authenticity cannot be readily verified. However, if the client computer 102 is a private computer that can be authenticated to the server 110, the image analysis described above can be performed by the computer 102 itself rather than the mobile communication device 130. In this alternative embodiment, it is not necessary to capture the image on the display 104 using the imaging device 176 in the mobile communication device 130. Rather, the image analyzer 178 illustrated in FIG. 3 can be implemented within the computer 102 to perform the same form of image analysis to thereby determine whether the image is constructed in accordance with the shared secret. In this embodiment, the shared secret is stored directly in the computer 102.

The shared secrets may be changed by both the mobile communication device 130 and the server 110 periodically or based on a network update mechanism or physical update mechanism to the mobile communication device 130 or the server 110.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for authentication of a server computer comprising:
   a client computer having a processor, a display, and a memory;
   a server computer having a processor and a memory, the server computer being communicatively coupled to the client computer via a network;
   an image generator associated with the server computer to generate an image containing at least one visible image element in accordance with a secret shared between an image analyzer and the server computer and not being known by a user of the client computer;
   a network interface associated with the computer server and coupled to the network to transmit the generated image to the client computer for display on the client computer display;
   a network interface associated with the client computer and coupled to the network to receive the generated image from the server computer;
   a wireless communication device having an imaging device associated therewith, the imaging device being configured to capture the image on the client computer display; and
   the image analyzer being associated with the wireless communication device and configured to analyze the generated image received from the server computer to determine if the received image contains the visible image element in accordance with the shared secret wherein the server computer is authenticated if the image analyzer determines that the received image contains the visible image element in accordance with the shared secret and not authenticated if the received image does not contain the visible image element in accordance with the shared secret;
   the wireless communication device being further configured to transmit the captured image to the server computer via a public land mobile network if the image analyzer determines that the captured image contains the visible image element in accordance with the shared secret.

2. The system of claim 1 wherein the shared secret is a geometric relationship between elements in the generated image and the image analyzer is configured to analyze the received image to determine if the geometric relationship exists wherein the server computer is authenticated if the image analyzer determines that the received image has the correct geometric relationship.

3. The system of claim 1 wherein the shared secret is a mathematical relationship between elements in the generated image and the image analyzer is configured to analyze the received image to determine if the mathematical relationship exists wherein the server computer is authenticated if the image analyzer determines that the received image has the correct mathematical relationship.

4. The system of claim 1 wherein the shared secret is a required number of elements of a certain type in the generated image and the image analyzer is configured to analyze the received image to determine if the required number of elements of the certain type exists in the received image wherein the server computer is authenticated if the image analyzer determines that the received image has the required number of elements of the certain type.

5. The system of claim 1 wherein the shared secret is a required number of elements of a certain color in the generated image and the image analyzer is configured to analyze the received image to determine if the required number of elements of the certain color exists in the received image wherein the server computer is authenticated if the image analyzer determines that the received image has the required number of elements of the certain color.

6. The system of claim 1 wherein the shared secret is a required element of a certain color in the generated image and the image analyzer is configured to analyze the received image to determine if the required element of the certain color exists in the received image wherein the server computer is authenticated if the image analyzer determines that the received image has the required element of the certain color.

7. The system of claim 1 wherein the shared secret is a combination of one or more elements selected a group of required elements comprising a geometric relationship between elements in the generated image, a mathematical relationship between elements in the generated image, a required number of elements of a certain type in the generated image, a required number of elements of a certain color in the generated image, and a required element of a certain color in the generated image wherein the server computer is authenticated if the image analyzer determines that the received image has the required combination of one or more elements.

8. The system of claim 1 wherein the server computer processor is further configured to provide a secret selection process to permit the client computer to select the shared secret from among a plurality of shared secrets, the image generator being further configured to generate the image containing the visible image element in accordance with the selected secret shared between the client computer and the server computer.

9. The system of claim 1 wherein the server computer is configured to provide a log-in process for the client computer wherein the image generator is configured to dynamically generate the image containing the visible image element in accordance with the secret shared between the client computer and the server computer during the log-in process.

10. The system of claim 1, further comprising a data storage structure to store the image generated by the image generator wherein the server computer is further configured to provide a log-in process for the client computer, and to retrieve the stored image from the data storage structure and transmit the retrieved image to the client computer during the log-in process.

11. A system for authentication of an unauthenticated server computer comprising:
a client computer having:
a display:
a memory configured to store a secret shared with a previously authenticated server; and
a network interface configured to communicate with the unauthenticated server computer and to receive an image therefrom in response to an authentication request from the client computer, the display being configured to display the received image; and
a wireless communication device having an imaging device associated therewith, the imaging device being configured to capture the image on the display;
an image processor associated with the mobile communication device and configured to analyze the image received from the unauthenticated server computer to determine if the received image contains a visible image element in accordance with the shared secret wherein the unauthenticated server computer is authenticated if the image processor determines that the received image contains the visible image element in accordance with the shared secret wherein the shared secret is unknown to a user of the client computer;
the wireless communication device being further configured to transmit the captured image to the authenticated server computer via a public land mobile network if the image processor determines that the captured image contains the visible image element in accordance with the shared secret.

12. The system of claim 11 wherein the shared secret does not identify the image itself, but only has information related to the visible image element of the shared secret contained within the received image.

13. The system of claim 11 wherein the shared secret element is a geometric relationship between objects in an image and the image processor is configured to analyze the received image to determine if the geometric relationship exists wherein the unauthenticated server computer is authenticated if the image processor determines that the received image has the correct geometric relationship between objects.

14. The system of claim 11 wherein the shared secret element is a mathematical relationship between objects in an image and the image processor is configured to analyze the received image to determine if the mathematical relationship exists wherein the unauthenticated server computer is authenticated if the image processor determines that the received image has the correct mathematical relationship between objects.

15. The system of claim 11 wherein the shared secret element is a required number of objects of a certain type in an image and the image processor is configured to analyze the received image to determine if the required number of objects of the certain type exist in the received image wherein the unauthenticated server computer is authenticated if the image processor determines that the received image has the required number of objects of the certain type.

16. The system of claim 11 wherein the shared secret element is a required number of objects of a predetermined color in an image and the image processor is configured to analyze the received image to determine if the required number of objects of the predetermined color exists in the received image wherein the unauthenticated server computer is authenticated if the image processor determines that the received image has the required number of objects of the predetermined color.

17. The system of claim 11 wherein the shared secret element is a required object of a predetermined color in an image and the image analyzer is configured to analyze the received image to determine if the required object of the predetermined color exists in the received image wherein the unauthenticated server computer is authenticated if the image processor determines that the received image has the required object of the predetermined color.

18. The system of claim 11 wherein the shared secret element is a combination of one or more elements in an image selected from a group of required elements comprising a geometric relationship between objects in the image, a mathematical relationship between objects in the image, a required number of objects of a certain type in the image, a required number of objects of a predetermined color in the image, and a required objects of a predetermined color in the image wherein the unauthenticated server computer is authenticated if the image processor determines that the received image has the required combination of one or more objects.

19. A method for authentication of an unauthenticated server computer, comprising:
storing a secret shared with a previously authenticated server computer;
requesting an authentication process for the unauthenticated server computer;
receiving an image from the unauthenticated server computer;
displaying the received image;
capturing the displayed image using an imaging device on a wireless communication device;
the wireless communication device analyzing the captured image to determine if the received image contains a visible image element specified in accordance with the shared secret;
authenticating the unauthenticated server computer, based on the image analysis, if the received image contains the visible image element specified in accordance with the shared secret;
not authenticating the unauthenticated server computer, based on the image analysis, if the received image does not contain the visible image element specified in accordance with the shared secret; and
transmitting the captured image to the authenticated server computer via a public land mobile network if the captured image contains the visible image element specified in accordance with the shared secret, wherein the shared secret is unknown to a user of the wireless communication device.

20. The method of claim 19 wherein the shared secret does not identify the image itself, but only has information related to the element of the shared secret contained within the received image.

21. The method of claim 19 wherein the shared secret element is a geometric relationship between objects in an image and analyzing the received image comprises analyzing the received image to determine if the geometric relationship between objects exists wherein the unauthenticated server computer is authenticated if the received image has the correct geometric relationship between objects.

22. The method of claim 19 wherein the shared secret element is a mathematical relationship between objects in an image and analyzing the received image comprises analyzing the received image to determine if the mathematical relationship between objects exists wherein the unauthenticated server computer is authenticated if the received image has the correct mathematical relationship between objects.

23. The method of claim 19 wherein the shared secret element is a required number of objects of a certain type in the image and analyzing the received image comprises analyzing the received image to determine if the image contains the required number of objects wherein the unauthenticated server computer is authenticated if the received image has the required number of objects.

24. The method of claim 19 wherein the shared secret element is a required number of objects of a predetermined color in the image and analyzing the received image comprises analyzing the received image to determine if the image contains the required number of objects of the predetermined color wherein the unauthenticated server computer is authenticated if the received image has the required number of objects of the predetermined color.

25. The method of claim 19 wherein the shared secret element is a required object of a predetermined color in the generated image and analyzing the received image comprises analyzing the received image to determine if the image contains the required object of the predetermined color wherein the unauthenticated server computer is authenticated if the received image has the required object of the predetermined color.

26. The method of claim 19 wherein the shared secret element is a combination of one or more elements selected from a group of required elements comprising a geometric relationship between objects in an image, a mathematical relationship between objects in the image, a required number of objects of a certain type in the image, a required number of objects of a predetermined color in the image, and a required objects of a predetermined color in the image and analyzing the received image comprises analyzing the received image to determine if the image contains the required combination of one or more objects wherein the unauthenticated server computer is authenticated if the received image has the required combination of one or more objects.

27. The method of claim 19, further comprising modifying the shared secret to thereby alter the element specified in accordance with the modified shared secret.

28. The method of claim 19, further comprising dynamically generating the image containing the visible image element specified in accordance with the shared secret in response to requesting the authentication process for the unauthenticated server computer.

29. The method of claim 19, further comprising generating the image containing the visible image element specified in accordance with the shared secret in advance of requesting the authentication process and storing the generated image until there is a request for the authentication process for the unauthenticated server computer.

* * * * *